Nov. 21, 1950
H. E. PAULSON
2,530,720
HYDRAULIC VEHICLE DRIVE WITH INDIVIDUAL
MOTORS FOR MULTIPLE DRIVEN PARTS
Filed March 4, 1944
2 Sheets-Sheet 1
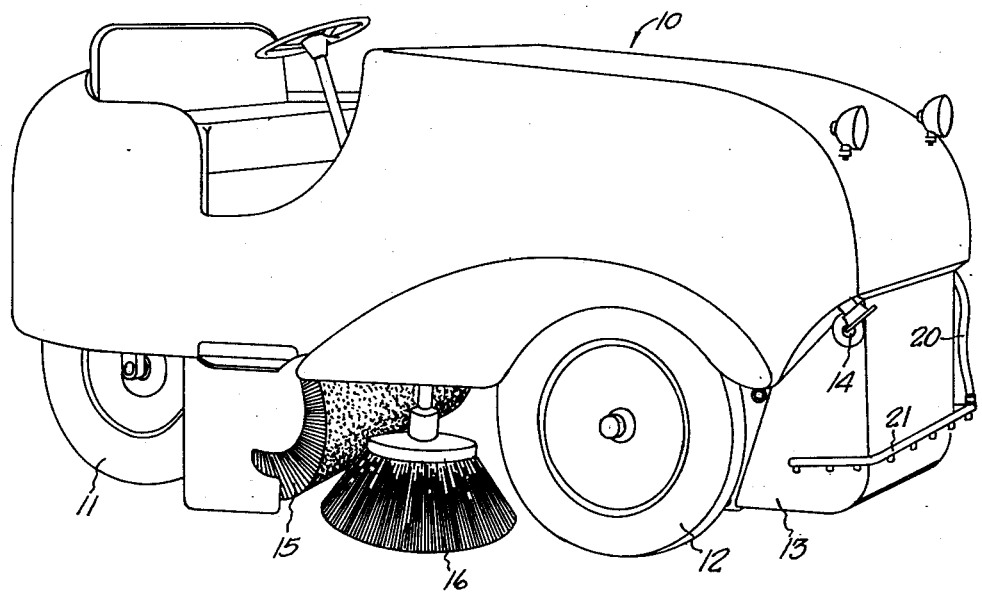
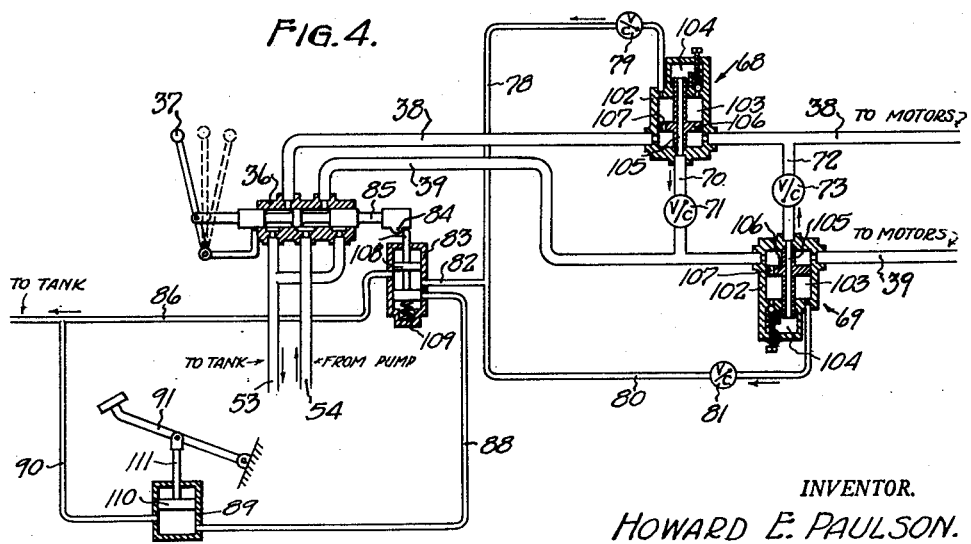
INVENTOR.
HOWARD E. PAULSON.

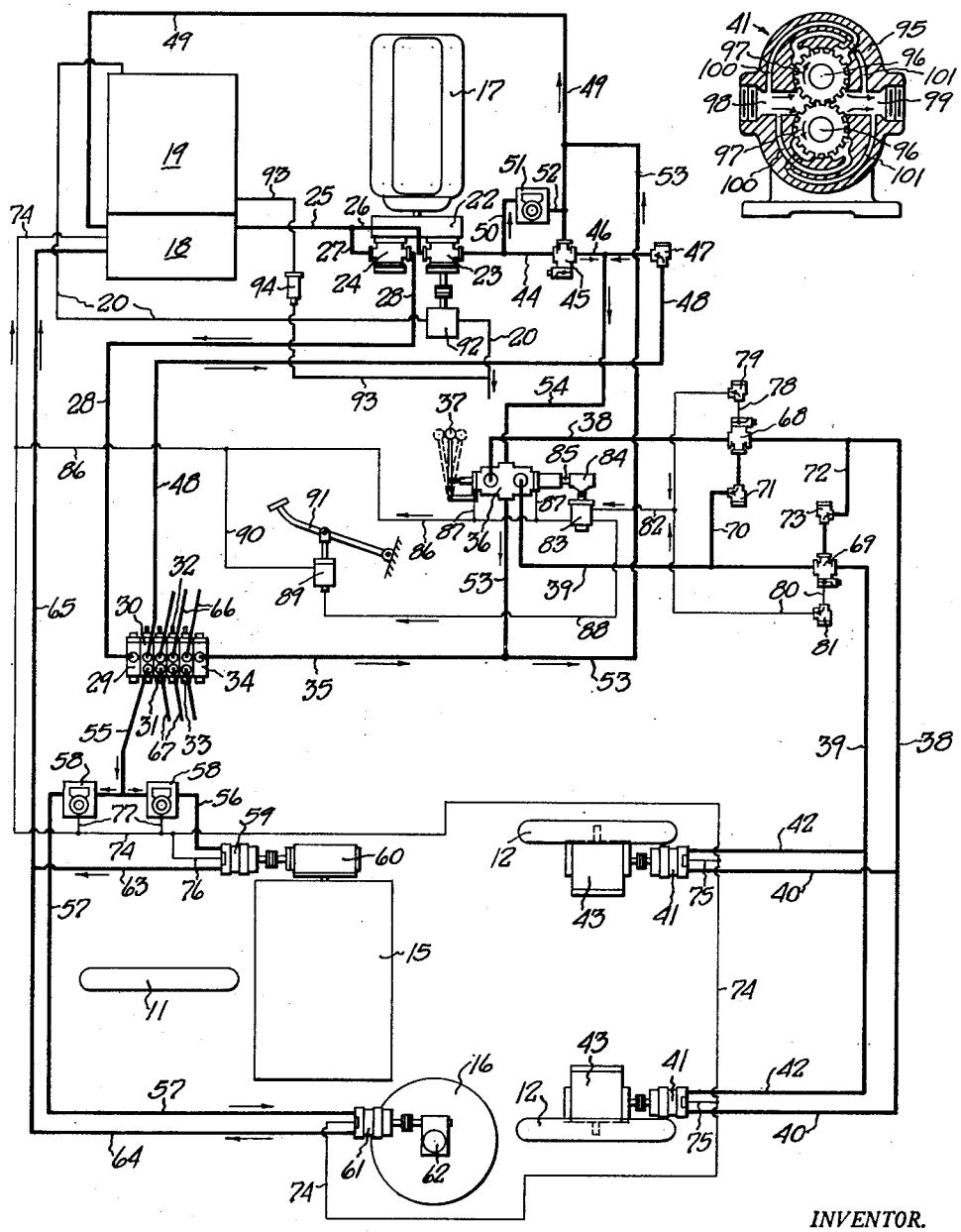

Patented Nov. 21, 1950

2,530,720

UNITED STATES PATENT OFFICE 2,530,720

HYDRAULIC VEHICLE DRIVE WITH INDIVIDUAL MOTORS FOR MULTIPLE DRIVEN PARTS

Howard E. Paulson, South Bend, Ind., assignor to Municipal Supply Company, South Bend, Ind., a corporation of Indiana Application March 4, 1944, Serial No. 525,126

8 Claims. (Cl. 15—82)

This invention relates to improvements in vehicle drives. More particularly, it relates to a drive for a vehicle such as a street sweeper.

Certain characteristics of street sweepers, such as the positioning of driving wheels on opposite sides of a low level refuse collecting container, and the inclusion of driven brushes at different locations on the vehicle and in different positions, render the provision of mechanical drive means objectionable. Thus it is conventional to employ chain drives for operating the various driven parts of the device. Such conventional mechanical drives have many disadvantages, some of which are the rapid wear to which such conventional drives are subject under the conditions of use and the difficulties encountered in repairing them.

The primary object of this invention is to provide a hydraulic drive for all driven parts of a vehicle.

A further object is to provide novel means for controlling the speed of operation of the driven parts of a vehicle.

A further object is to provide a hydraulic vehicle drive with means to prevent instantaneous development of high pressure upon reversing operation thereof.

A further object is to provide control means for a hydraulic drive which operates slowly to prevent instantaneous braking or deceleration of the vehicle.

A further object is to provide a vehicle drive with control means operable selectively to drive the vehicle wheels or to brake them simultaneously and equally.

A further object is to provide a hydraulic vehicle drive having a pump, individual wheel motors, drive lines between said pump and motors, and control means operating to maintain the liquid in the drive lines to said motors in a static condition to brake the wheels, and to simultaneously by-pass at said control means and return to said pumps the liquid flowing therefrom.

A further object is to provide a hydraulic vehicle drive including a pump, a wheel motor, drive lines connecting said pump and motor, and means for controlling the direction of liquid flow through said lines to said motor for the purpose of controlling the direction in which said wheels are driven.

A further object is to provide a vehicle drive having a pump, a wheel motor, and lines connecting said pump and motor, wherein reduction gearing is interposed between said motor and wheel to permit the use of smaller motors and lower pressures than would be required with a direct drive connection between the motor and the wheel.

A further object is to provide a hydraulic vehicle drive including a plurality of pumps and motors connected in a circuit, each motor normally operating from a selected pump, said circuit including control means for directing liquid from all pumps to selected motors to obtain increased speed of operation of said selected motors.

Other objects will be apparent from the description and appended claims.

In the drawings:

Fig. 1 is a perspective view of a street sweeper.

Fig. 2 is a diagrammatic view of the vehicle drive.

Fig. 3 is a transverse sectional view of a wheel motor.

Fig. 4 is a diagrammatic view of a portion of the vehicle drive circuit, illustrating certain control members in cross section.

Referring to the drawings, which illustrate a preferred embodiment of the invention the numeral 10 designates a street sweeper having a rear steering wheel 11 and front driving wheels 12. A dirt hopper 13 is positioned between the front wheels 12, being pivoted at 14 and being open at its rear portion to receive dirt swept therein by a transverse horizontal cylindrical rotary brush or broom 15 positioned between the front and rear wheels. A vertical rotary brush or broom 16 is positioned forwardly and laterally outwardly of broom 15 to sweep dirt from a street gutter into the path of broom 15.

The vehicle is driven by an internal combustion engine 17 and carries a sealed oil tank 18 and a water tank 19. A line 20 connects the water tank 19 with a water sprinkler 21 at the front of the vehicle.

The engine 17 has a gear box 22 connected therewith, and a pair of pumps 23 and 24 are connected with the gear box to be driven at predetermined speed. Pumps 23 and 24 may be of any suitable type, but I prefer to use vane type rotary pumps to insure a constant liquid pressure and flow. A conduit 25 is connected with oil tank 18, and conduits 26 and 27 branch therefrom and lead to pumps 23 and 24. A conduit 28 is connected with the outlet of pump 24 and leads to a series or bank of control valves, which is mounted at or adjacent the instrument panel of the vehicle within reach of the driver. This bank of valves includes an overload relief valve 29 to which conduit 28 is connected, a plurality of double-acting valve units 30, 31, 32 and 33, and an end plate or outlet unit 34. An outlet conduit 35 leads from said outlet unit 34.

A reversing control valve 36 has a three-position operating lever 37 within reach of the driver of the vehicle. Conduits 38 and 39 lead from opposite end ports of valve 36. Conduits 40 branch from conduit 38 and each is connected to one port of one of a pair of fluid motors 41, each suitably supported by the frame of the vehicle adjacent one of the driving wheels 12 of the vehicle; and conduits 42 branch from conduit 39 and each is connected to the other port of a fluid motor 41. Each fluid motor 41 has a driving connection with a speed reduction gear box 43, and the wheels 12 are driven from said gear boxes.

A conduit 44 is connected with and leads from the outlet port of pump 23 to a relief valve 45, preferably of the balanced piston type. A conduit 46 is connected with the pressure outlet of valve 45 and leads to a check valve 47. A line 48 leads from one outlet port of double acting valve 30 to check valve 47. A conduit 49 leads from the return port of relief valve 45 to oil tank 18. A conduit 50 branches from conduit 44 and is connected to a flow control valve 51 of the constant ratio type, whose outlet is connected by conduit 52 with conduit 49. A conduit 54 branches from conduit 46 and leads to the inlet port of valve 36. A conduit 53 leads from the outlet port of valve 36 and is connected with conduit 49 between the connection of conduits 51 and 49 and the tank 18. Conduit 35 is connected to conduit 53. In this arrangement, flow control valve 51 provides a bleed-off circuit arrangement for insuring a constant unidirectional rate of flow from pump 23 to valve 36, which may be supplemented by the flow from pump 24 through lines 28 and 48 and check valve 47.

A conduit 55 is connected with another outlet port of valve 30, and conduits 56 and 57 branch therefrom. Each of conduits 56 and 57 has a flow control valve 58 interposed therein. Conduit 56 leads to a fluid motor 59 which has a drive connection with a reduction gear box 60 from which transverse broom 15 is driven; and conduit 57 leads to a fluid motor 61 which has a drive connection with a reduction gear box 62 from which vertical broom 16 is driven. Conduit 63 leads from the outlet port of motor 59, and conduit 64 leads from the outlet port of motor 61, and these two conduits are connected with a conduit 65 leading to oil tank 18.

Conduits 66 and 67 lead from opposite outlet ports of each of the double acting valves 31, 32 and 33 to any parts of the vehicle to be hydraulically operated, such as to hoist devices for the gutter broom and sweeping broom, and to a dirt hopper operating device, none of which devices are shown here.

A relief valve 68 is interposed in conduit 38 and a relief valve 69 is interposed in conduit 39, both of these valves preferably being of the balanced piston type. A conduit 70 connects valve 68 with line 39 between valve 69 and valve 36, and a check valve 71 is interposed in conduit 70. A conduit 72 connects valve 69 with line 38 between valve 68 and motors 41, and a check valve 73 is interposed in conduit 72.

A system of drain lines of small diameter compared to the conduits described above is provided to connect the various operating parts to oil tank 18, to drain leakage occurring in said parts. Certain portions of said drain lines also serve to connect controls of the drive in the circuit. One of these drain lines is provided by a conduit 74 which is connected with fluid motor 61. Conduit 74 extends adjacent the other fluid motors of the device, being connected with each of motors 41 by conduits 75, and with motor 59 by conduit 76. Drain conduits 77 from the flow control valves 58 also connect with conduit 74. Conduit 74 extends to the oil tank 18.

Bleed line 78 leads from relief valve 68 and has a check valve 79 interposed therein, and a bleed line 80 leads from relief valve 69 and has a check valve 81 interposed therein. Conduits 78 and 80 are connected with a conduit 82 which leads to one port of a directional pilot control valve 83 positioned adjacent valve 36 to be controlled by a cam 84 mounted on the shaft 85 of said valve. A conduit 86 leads from another port of valve 83 to the oil tank 18, as by connection with conduit 74. Drain conduits 87 from the ends of valve 36 are connected with conduit 86. A conduit 88 is connected with a third port of directional pilot control valve 83 and leads to one port of a remote pressure control valve 89. A conduit 90 connects another port of remote pressure control valve 89 with conduit 86. The remote pressure control valve 89 is adapted to be actuated by brake pedal 91.

The water line 20 connecting the water tank 19 and the sprinklers 21 has a water pump 92 interposed therein which is driven from gear box 22. A second water line 93 is connected with water tank 19 and with line 20 at a point between pump 92 and sprinkler 21. A relief valve 94 is interposed in line 93.

The wheel motors 41 which are used in the device are preferably of the constant displacement gear type illustrated in Fig. 3. The motor construction illustrated comprises a chambered housing 95 in which two parallel shafts 96 are journaled. Each of said shafts mounts a gear 97, and said gears intermesh and fit with close rotative tolerance in said chamber. Ports 98 and 99 communicate with the housing chamber centrally thereof and in line with the intermeshing portions of said gears. Pressure equalizing bores 100 and 101, connected with the inlet and outlet ports respectively, communicate with the gear chambers in substantially diametric opposition to the parts of said ports at which pressure is applied to said gears. Liquid pressure is supplied to said motor through one of the ports and its connected pressure equalizing bores to rotate the gears, and is exhausted through the other port and its connected bores. The construction is symmetrical, and hence either port may serve selectively as the inlet or outlet, and the motor may be reversed by merely changing the direction of liquid flow.

The directional and braking control of the device is illustrated in Fig. 4. The pilot valve 36 has a spool type valve element positionable by lever 37 in any one of three operative positions, the opposite end positions establishing connection between line 54 and a selected one of lines 38 and 39, and the intermediate position establishing connection with the two outlet ports connected with line 53 and short circuiting lines 38 and 39 which are also open to line 54. The opposite end positions of the valve thus direct liquid flow through lines 38 and 39 and motors 41 in opposite directions, and thereby control the direction of vehicle movement, while the intermediate position is the idling position of the drive.

The two relief valves 68 and 69 each have housings 102 having main chamber 103 and secondary chamber 104, with a port therebetween normally closed by a spring pressed ball-type valve. A hollow shaft 105 is reciprocably mounted in the housing with one end in chamber 104 and the other end bearing against a valve port with which a pressure relief line, such as line 70 or line 72, communicates. A piston 106 is mounted on shaft 105 within the primary chamber 103, and has a pressure equalizing port 107 therethrough. The pressure inlet and outlet lines communicate with the main chamber 103 on the same side of piston 106 as the port communicating with the pressure relief line. The bleed port, such as that with which line 78 is connected, communicates with chamber 103 at the opposite side of piston 106. These relief valves 68 and 69 are so arranged that pressure is normally balanced on opposite sides of the piston of each, thus holding the parts in the position shown with the pressure relief port valved. An excess of pressure within the valve, as upon closing bleed line 78, causes the spring pressed valve to open, thereby permitting flow into the secondary chamber and through shaft 105 to the pressure relief line.

The directional pilot control valve 83 has the spool and shaft 108 thereof normally urged to its uppermost position by spring 109 to permit liquid flow between lines 82 and 86, and preventing liquid flow through line 88. At each of the two end positions of valve 36, the spring is free to urge the valve spool to said position. At the intermediate position of valve 36, however, the cam 84 engages and depresses the shaft and spool unit 108 against the action of spring 109 to close the port connected with line 86 and to open the port connected with line 88, to permit liquid flow from line 82 to line 88 through the valve.

The valve 89 has a piston 110 connected by shaft 111 with brake pedal 91. Inlet line 88 is connected with this valve at or adjacent the bottom thereof, and outlet line 90 is connected with the valve at a higher level, but below piston 110. Hence, depression of the brake pedal will serve either to controllably restrict liquid flow through outlet line 90 or to completely shut off said flow.

The operation of the drive is as follows: The pumps 23 and 24 are driven by engine 17 through gear box 22. Oil is pumped through circuits determined by the setting of the various controls in a continuous flow from and back to the oil tank 18. The flow of oil from pump 24 is directed to the valves 30, 31, 32, 33 and may be directed thereby to the different operative parts of the device, as through one or more sets of conduits 66 and 67, and the mechanism interposed therein, and back to said valves for discharge through conduits 35, 53 and 49 to tank 18, at the election of the operator. Valve 30 may be set in one position to cause oil to flow through conduits 55, 56 and 57 and the flow control valves 58, to operate motors 59 and 61 and thereby operate the brooms 15 and 16. Oil flows from said motors through conduits 63 and 64 to conduit 65 and tank 18. Flow control valves 58 permit selective or simultaneous operation of motors 59 and 61 at a constant speed regardless of change in load on either of the brooms. Flow control valves 58 may also be adjusted to regulate the speed of either of motors 59 and 61 without varying the volume of oil delivered by pump 24.

If the valve 30 is adjusted in another setting it directs oil from pump 24 therethrough to conduit 48, check valve 47, conduits 46 and 54 to reversing control valve 36 for operation of wheel motors 41.

Oil is delivered from pump 23 in a flow regulated by flow control valve 51, which is arranged in bleed-off arrangement to conduit 44 and is manually adjusted in a full range from zero to maximum flow. Assuming a setting of valve 51 to permit less than maximum flow therethrough, a controlled flow of oil will pass through relief valve 45 and conduits 46 and 54 to reversing control valve 36, being prevented from passing through conduit 48 by check valve 47. Therefore, it will be apparent that oil flow to operate the wheel motors 41 may be derived solely from pump 23, or simultaneously from both pumps 23 and 24 by setting valve 30 to deliver oil from pump 24 through conduit 48 as above described. Valve 36 controls the flow of oil through lines 38 and 39, for operating motors 41, which oil flow returns to valve 36 and passes therefrom through conduit 53 to conduit 49 leading to tank 18.

In practice, when brooms 15 and 16 are operated by oil flow from pump 24, the wheel motors are operated solely by the oil flow from pump 23, which results in a low speed operation of said wheels controlled by the setting of valve 51. This low speed operation may, for example, be in the range of from 3 to 6 miles per hour to insure efficient cleaning action of brooms 15 and 16. When higher speed, non-working travel of the vehicle is desired, the oil being pumped by both pumps may be directed to control valve 36 and motors 41 to permit speeds in the range of 15 to 20 miles per hour.

The direction in which the vehicle is operated is determined solely by the setting of valve 36. Thus, if oil is directed in a flow from conduit 54 through conduits 38 and 40 to motors 41, and back through conduits 42 and 39, the motors will operate in one direction, while a reverse oil flow will produce a reverse direction of operation of said motors. It may be mentioned at this point that the use of the reduction gear boxes interposed between the motor shafts and the wheel axles permits high velocity and low torque operation of the motors, since power out-put is increased by said gear boxes. This permits the use of small compact motors, whereas a direct drive from the motors 41 to the wheels would require the use of very large motors to obtain adequate driving power. This feature is very important because the tread spacing of the vehicle can be held at a minimum consistent with the desired width of the dirt collecting container, thereby facilitating maneuverability of the vehicle and holding its cost and weight to a minimum.

The relief valves 68 and 69 in the lines 38 and 39 leading to wheel motors 40 are important for several reasons. First, if an overload should develop in lines 38 and 39, as in the event the vehicle struck some stationary obstacle while the pumps were operating and the control valve 36 was set for vehicle movement, the valves 68 and 69 will open automatically to relieve the overload pressure. Hence the motors would be by-passed automatically until such time as the controls were manipulated by the driver to correct the valve settings, as by shifting lever 37 of valve 36 to intermediate position to direct oil delivered thereto by line 54 to lines 53 and 49 to the tank. The last named valve position corresponds to the neutral position of the transmission of a conventional mechanical vehicle drive.

The second important function of the relief valves 68 and 69 is to cooperate with other parts to brake the vehicle. The braking operation is as follows: When lever 37 adjusts valve 36 to neutral position, it also acts through cam 84 to adjust valve 83 to establish communication between lines 82 and 88. This results in a full idling or coasting condition of the drive, since oil is free to circulate in the lines 38 and 39 in the direction it has theretofore been flowing and is vented back to tank 18 at the discharge side of the line. This is true, however, only so long as the bleed ports of valves 68 and 69 are open to atmospheric pressure, i. e., as long as there is an unrestricted flow line from said bleed ports to tank 18. The operation of valve 83 above described provides such a flow through lines 88 and 90 to line 74 and tank 18. However, if the brake pedal is now depressed to restrict or shut off the liquid flow between lines 88 and 90 at valve 89, the flow of oil in lines 38 and 39 builds up a back pressure counter to the direction of flow and thereby stops the motors 41. When this back pressure reaches the point at which the relief valves are set to operate, the latter will open to by-pass liquid from one side of the line to the other, but this by-pass action only occurs after a braking pressure has developed in the lines. Braking occurs as follows: The deenergizing of lines 38 and 39 by valve 36 discontinues the supply of liquid pressure to operate the wheel motors, but the momentum of the vehicle continues this rotation of said motors so that they tend to operate as pumps. This pumping operation is retarded and substantially prevented, however, by the non-compressible character of the liquid in the system and by the deenergizing of the system both at valve 36 and at the bleed line by valve 89, hence the motors are positively stopped by the substantially trapped or static liquid in the system against which they act. Inasmuch as the operation of the valves 36 and 83 is sudden, valve 89 is selected to have a comparatively long throw whereby the back pressures which brake the drive motors, as above described, develop comparatively slowly and prevent sudden or abrupt stops which would tend to cause the vehicle to turn over.

The arrangement of the check valves 71 and 73 in the by-pass lines 70 and 72 is important because it prevents the development of excessive or dangerous pressures in the lines, for instance the instantaneous building up of excessive pressure upon reversal of the operative position of the valve 36. Thus, referring to Fig. 4 wherein the parts are adjusted so that line 39 is the pressure line and line 38 is the discharge line, it will be observed that a reversal of the operative position of valve 36 will make line 38 the pressure line and line 39 the discharge line, thereby tending to build up a high instantaneous pressure incident to the change in valve setting. However, the relief valves open as the pressure developed approaches the danger point, by-passing fluid between the two lines, until the motors 41 have time to stop and reverse their direction incident to the new setting of valve 36.

I claim:

1. A street sweeper having a driving wheel and a rotatable broom, fluid motors for driving said wheel and broom, respectively, a pair of pumps, a plurality of conduits connecting said pumps and said motors in hydraulic circuits, a pilot valve in circuit with one pump for controlling the direction of rotation of said wheel motors, and a valve in circuit with the other pump for selectively directing liquid flow to said broom motor or said pilot valve.

2. A street sweeper having driving wheels and a pair of rotatable brooms, a plurality of fluid motors each having a driving connection with one of said wheels and brooms, a pair of hydraulic circuits each including a pump and a control valve, a line connecting said valves, one of said valves controlling the direction of movement of said wheel motors, and the other valve selectively directing liquid flow to said broom motors or said first valve, said broom motors being connected in parallel in one circuit, and means for selectively controlling the relative rates of flow to said broom motors.

3. A street sweeper having a driving wheel and a rotatable broom, fluid motors for driving said wheel and broom, respectively, a pair of pumps, a pair of hydraulic circuits for said wheel and broom motors respectively, and each including one of said pumps and a control valve, and a line connecting said valves to direct the liquid flow from said broom motor circuit to said wheel motor circuit.

4. A street sweeper having a driving wheel and a rotatable broom, fluid motors for driving said wheel and broom, respectively, a pair of pumps, a pair of hydraulic circuits for said wheel and broom motors respectively, and each including one of said pumps and a control valve, and a line connecting said valves to direct the liquid flow from said broom motor circuit to said wheel motor circuit, each of said circuits having a line by-passing the motor thereof, and a flow control valve in the by-pass of said wheel motor circuit for normally controlling the speed of said wheel motor.

5. A street sweeper having a driving wheel and a rotatable broom, fluid motors for driving said wheel and broom, respectively, a pair of pumps, a pair of hydraulic circuits for said wheel and broom motors respectively, a control valve in each circuit, a line connecting said valves to direct flow from said broom circuit to said wheel circuit valve, by-pass lines connected with each valve, and a valve controlled by-pass branching from said wheel circuit between the pump and valve thereof.

6. A street sweeper having fluid driven sweeping means and driving wheels, a fluid motor for driving each wheel and said sweeping means, a pair of pumps, a motor control valve, a pair of hydraulic circuits each connecting a pump with said motor control valve, circuits connecting said wheels and said sweeping means with said valve, and a valve controlled by-pass in one pump circuit for controlling the speed of said motors.

7. A street sweeper having sweeping means and driving wheels, a fluid motor for driving each wheel and said sweeping means, a pair of pumps, a motor control valve, a pair of hydraulic circuits each connecting a pump with said motor control valve, a circuit connecting said wheels with said valve, and flow control means in one pump circuit for controlling wheel motor speed.

8. In a street sweeper having driving wheels, a rotatable broom and an engine, a pair of pumps driven by said engine, individual fluid motors for driving said broom and wheels respectively, a hydraulic circuit connecting a pump and said wheel motors, a directional control valve in said circuit, a second hydraulic circuit connected with the other pump and including branches leading to said broom and directional control valve respectively, a valve in said second circuit for directing liquid flow in a selected branch, flow control means in said first circuit for regulating the speed of said wheel motors, said directional control valve being adapted to control flow in said first circuit in a path by-passing said motors, and means for venting the by-passed portion of said wheel motor circuit.

HOWARD E. PAULSON.

REFERENCES CITED

The following references are of record in the file of this patent:

UNITED STATES PATENTS

| Number | Name | Date |
| --- | --- | --- |
| 639,541 | Dyer | Dec. 19, 1899 |
| 1,059,136 | Gafney | Apr. 15, 1913 |
| 1,179,736 | Manly | Apr. 18, 1916 |
| 1,803,932 | Dooley | May 5, 1931 |
| 1,932,760 | West | Oct. 31, 1933 |
| 1,982,711 | Vickers | Dec. 4, 1934 |
| 2,006,280 | Schlueter | June 25, 1935 |
| 2,228,411 | Sheridan | Jan. 14, 1941 |
| 2,300,280 | Teager | Oct. 27, 1942 |

FOREIGN PATENTS

| Number | Country | Date |
| --- | --- | --- |
| 413,217 | France | May 21, 1910 |